US008598267B2

(12) United States Patent
Dadalas et al.

(10) Patent No.: US 8,598,267 B2
(45) Date of Patent: Dec. 3, 2013

(54) FLUOROPOLYMER DISPERSION CONTAINING NO OR LITTLE LOW MOLECULAR WEIGHT FLUORINATED SURFACTANT

(75) Inventors: Michael C. Dadalas, Eggenfelden (DE); Rebekka Epsch, Berlin (DE); Friedrich Kloos, Mainz (DE); Leonard W. Harvey, Dowingtown, PA (US)

(73) Assignee: 3M Innovative Properties Company, St. Paul, MN (US)

( * ) Notice: Subject to any disclaimer, the term of this patent is extended or adjusted under 35 U.S.C. 154(b) by 954 days.

(21) Appl. No.: 11/851,431

(22) Filed: Sep. 7, 2007

(65) Prior Publication Data

US 2008/0287599 A1    Nov. 20, 2008

Related U.S. Application Data

(62) Division of application No. 10/486,860, filed on Feb. 13, 2004, now Pat. No. 7,279,522.

(30) Foreign Application Priority Data

Sep. 5, 2001    (EP) ..................................... 01203351

(51) Int. Cl.
*C08L 27/12*    (2006.01)
(52) U.S. Cl.
USPC ......... 524/544; 523/332; 526/214; 528/502 A
(58) Field of Classification Search
USPC ......... 524/544; 528/502 A; 523/332; 526/214
See application file for complete search history.

(56) References Cited

U.S. PATENT DOCUMENTS

| 2,534,058 A | 12/1950 | Renfrew |
| 2,559,749 A | 7/1951 | Benning |
| 2,713,593 A | 7/1955 | Brice et al. |
| 3,037,953 A | 6/1962 | Marks et at |
| 3,142,665 A | 7/1964 | Cardinal et al. |
| 3,179,614 A | 4/1965 | Edwards |
| 3,260,691 A | 7/1966 | Lavin et al. |
| 3,271,341 A | 9/1966 | Garrison |
| 3,315,201 A | 4/1967 | Werme |
| 3,316,201 A * | 4/1967 | Ulmschneider et al. ...... 523/340 |
| 3,345,317 A | 10/1967 | Hoashi |
| 3,391,099 A | 7/1968 | Punderson |
| 3,451,908 A | 6/1969 | Sianesi et al. |
| 3,489,595 A | 1/1970 | Brown, Jr. |
| 3,555,100 A | 1/1971 | Garth et al. |
| 3,635,926 A | 1/1972 | Gresham |
| 3,642,742 A | 2/1972 | Carlson |
| 3,721,696 A | 3/1973 | Sianesi et al. |
| 3,790,403 A | 2/1974 | Ribbans, III |
| 3,855,191 A | 12/1974 | Doughty, Jr. et al. |
| 3,882,153 A | 5/1975 | Seki et al. |
| 3,981,945 A | 9/1976 | Attwood et al. |
| 4,016,345 A | 4/1977 | Holmes |
| 4,025,709 A | 5/1977 | Blaise et al. |
| 4,049,863 A | 9/1977 | Vassiliou |
| 4,089,804 A * | 5/1978 | Falk .................................. 516/9 |
| 4,123,401 A | 10/1978 | Berghmans et al. |
| 4,131,711 A | 12/1978 | Attwood |
| 4,180,609 A * | 12/1979 | Vassiliou ....................... 428/212 |
| 4,252,859 A | 2/1981 | Concannon et al. |
| 4,262,101 A | 4/1981 | Hartwimmer et al. |
| 4,282,162 A | 8/1981 | Kuhls |
| 4,287,112 A | 9/1981 | Berghmans |
| 4,292,402 A | 9/1981 | Pollet et al. |
| 4,342,825 A | 8/1982 | Van Poucke et al. |
| 4,353,950 A | 10/1982 | Vassiliou |
| 4,369,266 A * | 1/1983 | Kuhls et al. ................... 523/332 |
| 4,380,618 A | 4/1983 | Khan et al. |
| 4,381,384 A | 4/1983 | Khan |
| 4,391,940 A | 7/1983 | Kuhls et al. |
| 4,425,448 A | 1/1984 | Concannon et al. |
| 4,439,385 A | 3/1984 | Kuhls et al. |
| 4,544,458 A | 10/1985 | Grot et al. |
| 4,548,986 A | 10/1985 | Suzuki et al. |
| 4,552,925 A | 11/1985 | Nakagawa et al. |
| 4,588,796 A | 5/1986 | Wheland |

(Continued)

FOREIGN PATENT DOCUMENTS

| CA | 2 354 138 | 6/2000 |
| DE | 3 828 063 | 2/1990 |

(Continued)

OTHER PUBLICATIONS

Drobny, Technology of Fluoropolymers, CRC Press LLC, 2001, p. 35.
Kokelenberg, H. and Pollet, R., "A New type fluortensides, based on the addition of nucleophiles to chlorotrifluoroethylene and hexafluoropropylene." Tenside Detergents, 1985, 22(1), pp. 22-27.
Apostolo et al., "Microemulsion Polymerization for Producing Fluorinated Structured Materials", Macromol. Symp. 2004, 206, pp. 347-360.
Ivanova et al., "Synthesis of Alcohols from Perfluorvinyl Esters", Zh. Vses. Khim Obsh 1999, (24), pp. 656-657.
W.C. Griffin "Calculation of HLB Values of Non-Ionic Surfactants", Journal of Society of Cosmetic Chemists, vol. 5, (1954) p. 259.
England, "Catalytic Conversion of Fluoroalkyl Alkyl Ethers to Carbonyl Compounds", J. Org. Chem., 1984, vol. 49, pp. 4007-4008.

(Continued)

*Primary Examiner* — Peter D. Mulcahy
*Assistant Examiner* — Henry Hu
(74) *Attorney, Agent, or Firm* — Julie Lapos-Kuchar; Brian Szymanski

(57) ABSTRACT

The present invention provides a fluoropolymer dispersion comprising fluoropolymer particles having an average particle size of 10 to 400 nm dispersed in water whereby the dispersion is free of fluorinated surfactant having a molecular weight of less than 1000 g/mol or contains the fluorinated surfactant having a molecular weight of less than 1000 g/mol in an amount of not more than 0.025% by weight based on the total weight of solids in the dispersion. The dispersion further comprises a non-ionic surfactant and an anionic surfactant selected from fluorinated anionic surfactants having a molecular weight of at least 1000 g/mol, non-fluorinated anionic surfactants and mixtures thereof.

7 Claims, No Drawings

(56) References Cited

U.S. PATENT DOCUMENTS

| | | | |
|---|---|---|---|
| 4,618,641 A | 10/1986 | Hengel | |
| 4,621,116 A | 11/1986 | Morgan | |
| 4,623,487 A | 11/1986 | Cope | |
| 4,766,190 A | 8/1988 | Morita et al. | |
| 4,789,717 A | 12/1988 | Giannetti et al. | |
| 4,832,879 A | 5/1989 | Hamprecht | |
| 4,861,845 A | 8/1989 | Slocum et al. | |
| 4,864,006 A | 9/1989 | Giannetti et al. | |
| 4,987,254 A | 1/1991 | Schwertfeger et al. | |
| 5,075,397 A | 12/1991 | Tonelli et al. | |
| 5,153,322 A | 10/1992 | Flynn | |
| 5,160,791 A | 11/1992 | Tannenbaum | |
| 5,168,107 A | 12/1992 | Tannenbaum | |
| 5,182,342 A | 1/1993 | Feiring et al. | |
| 5,198,491 A | 3/1993 | Honda et al. | |
| 5,219,910 A | 6/1993 | Stahl et al. | |
| 5,223,343 A | 6/1993 | Tannenbaum | |
| 5,229,480 A | 7/1993 | Uschold | |
| 5,230,961 A | 7/1993 | Tannenbaum | |
| 5,272,186 A | 12/1993 | Jones | |
| 5,285,002 A | 2/1994 | Grootaert | |
| 5,312,935 A | 5/1994 | Mayer et al. | |
| 5,442,097 A | 8/1995 | Obermeier et al. | |
| 5,447,982 A | 9/1995 | Kamba et al. | |
| 5,453,477 A | 9/1995 | Oxenrider et al. | |
| 5,463,021 A | 10/1995 | Beyer et al. | |
| 5,478,651 A | 12/1995 | Tannenbaum | |
| 5,488,142 A | 1/1996 | Fall et al. | |
| 5,498,680 A | 3/1996 | Abusleme et al. | |
| 5,530,078 A | 6/1996 | Felix et al. | |
| 5,532,310 A | 7/1996 | Grenfell et al. | |
| 5,562,991 A | 10/1996 | Tannenbaum | |
| 5,576,381 A | 11/1996 | Bladel et al. | |
| 5,591,877 A | 1/1997 | Obermeier et al. | |
| 5,608,022 A | 3/1997 | Nakayama et al. | |
| 5,656,201 A | 8/1997 | Visca et al. | |
| 5,663,255 A | 9/1997 | Anolick et al. | |
| 5,667,846 A | 9/1997 | Thomas | |
| 5,688,884 A | 11/1997 | Baker et al. | |
| 5,700,859 A | 12/1997 | Ogura et al. | |
| 5,710,345 A | 1/1998 | Navarrini | |
| 5,721,053 A | 2/1998 | Thomas | |
| 5,763,552 A | 6/1998 | Feiring et al. | |
| 5,789,083 A | 8/1998 | Thomas | |
| 5,789,508 A | 8/1998 | Baker et al. | |
| 5,804,650 A | 9/1998 | Tsuda et al. | |
| 5,895,799 A | 4/1999 | Wu et al. | |
| 5,955,556 A | 9/1999 | McCarthy et al. | |
| 5,959,026 A | 9/1999 | Abusleme et al. | |
| 5,969,063 A * | 10/1999 | Parker et al. | 526/200 |
| 5,990,330 A | 11/1999 | Sulzbach et al. | |
| 6,013,795 A | 1/2000 | Manzara et al. | |
| 6,025,307 A | 2/2000 | Chittofrati et al. | |
| 6,037,399 A | 3/2000 | Wu et al. | |
| 6,103,843 A | 8/2000 | Abusleme et al. | |
| 6,103,844 A | 8/2000 | Brothers | |
| 6,126,849 A | 10/2000 | Yamana et al. | |
| 6,136,893 A * | 10/2000 | Yamashita et al. | 523/310 |
| 6,153,688 A | 11/2000 | Miura et al. | |
| 6,218,464 B1 * | 4/2001 | Parker et al. | 524/805 |
| 6,245,923 B1 | 6/2001 | Sulzbach et al. | |
| 6,255,384 B1 | 7/2001 | McCarthy et al. | |
| 6,255,536 B1 | 7/2001 | Worm et al. | |
| 6,267,865 B1 | 7/2001 | Polson et al. | |
| 6,365,684 B1 | 4/2002 | McCarthy et al. | |
| 6,376,710 B2 * | 4/2002 | Matsumoto et al. | 564/244 |
| 6,391,182 B2 | 5/2002 | Smeltzer et al. | |
| 6,395,848 B1 | 5/2002 | Morgan et al. | |
| 6,410,626 B1 | 6/2002 | Wada et al. | |
| 6,429,258 B1 | 8/2002 | Morgan et al. | |
| 6,436,244 B1 | 8/2002 | Fuhrer et al. | |
| 6,482,979 B1 | 11/2002 | Hintzer et al. | |
| 6,512,063 B2 | 1/2003 | Tang | |
| 6,518,442 B1 | 2/2003 | Felix et al. | |
| 6,576,703 B2 | 6/2003 | Kapeliouchko et al. | |
| 6,593,416 B2 | 7/2003 | Grootaert et al. | |
| 6,602,968 B1 | 8/2003 | Bekiarian et al. | |
| 6,610,788 B1 | 8/2003 | Takakura et al. | |
| 6,613,941 B1 | 9/2003 | Felix et al. | |
| 6,624,268 B1 | 9/2003 | Maekawa et al. | |
| 6,632,508 B1 | 10/2003 | Pellerite et al. | |
| 6,642,307 B1 | 11/2003 | Sogabe et al. | |
| 6,642,415 B1 | 11/2003 | Fuhrer et al. | |
| 6,660,798 B1 | 12/2003 | Marchese et al. | |
| 6,677,414 B2 | 1/2004 | Hintzer et al. | |
| 6,689,854 B2 * | 2/2004 | Fan et al. | 526/243 |
| 6,693,152 B2 | 2/2004 | Kaspar et al. | |
| 6,703,520 B2 | 3/2004 | Hintzer et al. | |
| 6,706,193 B1 | 3/2004 | Burkard et al. | |
| 6,710,123 B1 | 3/2004 | Amin-Sanayei et al. | |
| 6,737,489 B2 | 5/2004 | Linert et al. | |
| 6,750,304 B2 | 6/2004 | Kaspar et al. | |
| 6,761,964 B2 | 7/2004 | Tannenbaum | |
| 6,774,164 B2 | 8/2004 | Lyons et al. | |
| 6,794,550 B2 * | 9/2004 | Hintzer et al. | 570/178 |
| 6,815,040 B2 | 11/2004 | Pellerite et al. | |
| 6,822,059 B2 | 11/2004 | Buckanin et al. | |
| 6,825,250 B2 | 11/2004 | Epsch et al. | |
| 6,833,403 B1 * | 12/2004 | Bladel et al. | 524/458 |
| 6,846,570 B2 | 1/2005 | Leech et al. | |
| 6,861,466 B2 | 3/2005 | Dadalas et al. | |
| 6,861,490 B2 | 3/2005 | Kaspar et al. | |
| 6,869,997 B2 | 3/2005 | Wille et al. | |
| 6,878,772 B2 | 4/2005 | Visca et al. | |
| 6,956,078 B2 | 10/2005 | Cavanaugh et al. | |
| 6,972,094 B2 | 12/2005 | Ichida et al. | |
| 7,026,036 B2 | 4/2006 | Leech et al. | |
| 7,041,728 B2 | 5/2006 | Zipplies et al. | |
| 7,045,571 B2 | 5/2006 | Tan et al. | |
| 7,064,170 B2 | 6/2006 | Kaspar et al. | |
| 7,074,862 B2 | 7/2006 | Kaspar et al. | |
| 7,122,608 B1 | 10/2006 | Brinati et al. | |
| 7,125,941 B2 | 10/2006 | Kaulbach et al. | |
| 7,126,016 B2 | 10/2006 | Fu et al. | |
| 7,141,620 B2 | 11/2006 | Hoshikawa et al. | |
| 2002/0040119 A1 | 4/2002 | Tang | |
| 2002/0198345 A1 | 12/2002 | Grootaert et al. | |
| 2003/0125421 A1 | 7/2003 | Bladel et al. | |
| 2003/0220442 A1 | 11/2003 | Epsch et al. | |
| 2004/0010156 A1 | 1/2004 | Kondo et al. | |
| 2004/0087703 A1 | 5/2004 | Kaspar et al. | |
| 2004/0116742 A1 | 6/2004 | Guerra | |
| 2004/0143052 A1 | 7/2004 | Epsch et al. | |
| 2004/0186219 A1 | 9/2004 | Dadalas et al. | |
| 2004/0242755 A1 | 12/2004 | Araki et al. | |
| 2005/0043471 A1 | 2/2005 | Epsch et al. | |
| 2005/0070633 A1 | 3/2005 | Epsch et al. | |
| 2005/0090601 A1 | 4/2005 | Dadalas et al. | |
| 2005/0090613 A1 | 4/2005 | Maruya et al. | |
| 2005/0107506 A1 | 5/2005 | Kapeliouchko et al. | |
| 2005/0113519 A1 | 5/2005 | Buckanin et al. | |
| 2005/0154104 A1 | 7/2005 | Malvasi et al. | |
| 2005/0228127 A1 | 10/2005 | Tatemoto et al. | |
| 2006/0003168 A1 | 1/2006 | Dadalas et al. | |
| 2006/0041051 A1 | 2/2006 | Nakatani et al. | |
| 2006/0160947 A1 | 7/2006 | Tan et al. | |
| 2006/0281946 A1 | 12/2006 | Morita et al. | |
| 2007/0004848 A1 * | 1/2007 | Hintzer et al. | 524/544 |
| 2007/0015864 A1 | 1/2007 | Hintzer et al. | |
| 2007/0025902 A1 | 2/2007 | Hintzer et al. | |
| 2007/0082993 A1 | 4/2007 | Amin-Sanayei et al. | |
| 2007/0117915 A1 | 5/2007 | Funaki et al. | |
| 2007/0135558 A1 | 6/2007 | Nobuhiko et al. | |
| 2007/0149733 A1 | 6/2007 | Otsuka et al. | |
| 2007/0155891 A1 | 7/2007 | Nobuhiko et al. | |

FOREIGN PATENT DOCUMENTS

| | | |
|---|---|---|
| DE | 199 32 771 | 1/2001 |
| DE | 199 33 696 | 1/2001 |
| DE | 100 18 853 | 10/2001 |
| EP | 0 014 431 | 8/1980 |
| EP | 0 015 481 | 9/1980 |
| EP | 0 022 257 | 1/1981 |

(56) References Cited

FOREIGN PATENT DOCUMENTS

| | | |
|---|---|---|
| EP | 0 222 945 | 11/1984 |
| EP | 0 219 065 | 4/1987 |
| EP | 0 524 585 | 1/1993 |
| EP | 0 525 660 | 2/1993 |
| EP | 0 612 770 | 8/1994 |
| EP | 0 625 526 | 11/1994 |
| EP | 0 632 009 | 1/1995 |
| EP | 0 649 863 | 4/1995 |
| EP | 0 712 882 | 5/1996 |
| EP | 0718364 | 6/1996 |
| EP | 0739960 | 10/1996 |
| EP | 0 752 432 | 1/1997 |
| EP | 0 816 397 | 1/1998 |
| EP | 0 818 506 | 1/1998 |
| EP | 0 890 592 B1 | 1/1999 |
| EP | 0 894 541 | 2/1999 |
| EP | 0 964 009 | 12/1999 |
| EP | 0 969 927 | 1/2000 |
| EP | 1 059 342 | 12/2000 |
| EP | 1059333 | 12/2000 |
| EP | 1 083 441 | 3/2001 |
| EP | 1160258 | 12/2001 |
| EP | 1245596 | 10/2002 |
| EP | 1245596 A1 * | 10/2002 |
| EP | 1 323 677 | 7/2003 |
| EP | 1 334 996 | 8/2003 |
| EP | 1 364 972 | 11/2003 |
| EP | 1 462 461 | 9/2004 |
| EP | 1 514 848 | 4/2006 |
| GB | 642025 | 8/1950 |
| GB | 821353 | 10/1959 |
| GB | 966814 | 8/1964 |
| GB | 1069364 * | 5/1967 |
| GB | 1073392 * | 6/1967 |
| GB | 1349764 * | 4/1974 |
| JP | 46011031 | 8/1966 |
| JP | 2000-128934 | 5/2000 |
| JP | 2002-179870 | 6/2002 |
| JP | 2002-308914 | 10/2002 |
| JP | 2002-317003 | 10/2002 |
| JP | 2003-043625 | 2/2003 |
| JP | 2003-119204 | 4/2003 |
| JP | 2003-212919 | 7/2003 |
| JP | 2004-358397 | 12/2004 |
| JP | 2004-359870 | 12/2004 |
| JP | 2005-008775 | 1/2005 |
| JP | 2005-105045 | 4/2005 |
| RU | 2158274 | 10/2000 |
| WO | WO 94/14904 | 7/1994 |
| WO | WO 96/24622 | 8/1996 |
| WO | WO 97/17381 | 5/1997 |
| WO | WO 98/50603 | 11/1998 |
| WO | WO 00/22002 | 4/2000 |
| WO | WO 00/35971 | 6/2000 |
| WO | WO 00/52060 | 9/2000 |
| WO | WO 00/71590 | 11/2000 |
| WO | WO 01/46116 | 6/2001 |
| WO | WO 01/79332 | 10/2001 |
| WO | WO 02/14223 | 2/2002 |
| WO | WO 02/20676 | 3/2002 |
| WO | 02/44226 | 6/2002 |
| WO | WO-02/44226 A1 * | 6/2002 |
| WO | WO 02/078862 | 10/2002 |
| WO | 02/095121 | 11/2002 |
| WO | WO 02/088203 | 11/2002 |
| WO | WO 02/088206 | 11/2002 |
| WO | WO 02/088207 | 11/2002 |
| WO | WO 03/020836 | 3/2003 |
| WO | WO 03/051988 | 6/2003 |
| WO | WO 03/087176 | 10/2003 |
| WO | WO 03/087179 | 10/2003 |
| WO | WO 2004/031141 | 4/2004 |
| WO | 2004/067588 | 8/2004 |
| WO | WO 2005/003075 | 1/2005 |
| WO | WO 2005/042593 | 5/2005 |
| WO | WO 2005/056614 | 6/2005 |
| WO | WO 2005/063827 | 7/2005 |
| WO | WO 2005/065800 | 7/2005 |
| WO | WO 2005/082785 | 9/2005 |
| WO | WO 2005/121290 | 12/2005 |
| WO | WO 2006/011533 | 2/2006 |
| WO | WO 2006/020721 | 2/2006 |
| WO | 2007/120348 | 10/2007 |

OTHER PUBLICATIONS

Sudol et al., "Miniemulsion Polymerization", Emulsion Polymerization and Emulsion Polymers, John Wiley & Sons, 1997, Chapter. 20.
Candau, "Inverse Emulsion and Microemulsion Polymerization", Emulsion Polymerization and Emulusion Polymers, John Wiley & Sons, 1997, Chapter 21.
Chi et al., "A Facile Synthesis of Partly-fluorinated Ethers Using Perfluroporpoxyethylene and Aliphatic Alcohols", Bull. Korean Chem. Soc., 1999, vol. 20, No. 2, pp. 220-222.
Ebnesajjad, "Fluoroplastics, vol. 1, Non-Melt Processible Fluoroplastics", Plastics Design Library, NY, 2000, pp. 285-295.
Ebnesajjad, "Fluoroplastics, vol. 2, Melt Processible Fluoropolymers", Plastics Design Library, NY, 2003, pp. 1-21.
ASTM D 4895-04, "Standard Specification for Polytetrafluoroethylene (PTFE) Resin Produced From Dispersion", 2004, pp . 1-1 4.
"Guide to Protein Purification, Methods in Enzymology," Deutscher, M. vol. 182, 24. 1990. (pp. 309-317).
"High Performance Polymers for Diverse Applications," Modern Fluoropolymers. Edited by John Scheirs. John Wiley & Sons, 1997.
"Hydrogen-Ion Activity to Laminated Materials, Glass," Encyclopedia of Chemical Technology. John Wiley & Sons, vol. 13, $3^{rd}$ Ed. 1981. (p. 687).
"Immobilized Biocatalysts to Isoprene," Ullmann's Encyclopedia of Industrial Chemistry. vol A14. 1985. (p. 439-459).
"Identification to Lignin," Encyclopedia of Polymer Science and Engineering. John Wiley & Sons, vol. 8. 1987 (p. 347).
"Nonionic Surfactants." Edited by Martin J. Schick. 1967.
"Synthesis of Perfluoroalkyl Vinyl Ether Acids and Derivatives," Perfluoroalkyl Vinyl Ether Acids. Raymond Sullivan, vol. 34, No. 6, Jun. 1969, p. 1841-1844.
Storsberg, Joachim and Ritter, Helmut, "Cyclodextrins in Polymer Synthesis: A 'Green' Route to Fluorinated Polymers via Cyclodextrin Complexes in Aqueous Solution", *Macromol. Chem Phys.*, 2002, pp. 812-818.
Search Report for International Application No. PCT/US2002/25114, dated Dec. 12, 2002, 3 pages.

\* cited by examiner

FLUOROPOLYMER DISPERSION CONTAINING NO OR LITTLE LOW MOLECULAR WEIGHT FLUORINATED SURFACTANT

This application is a divisional of U.S. Ser. No. 10/486,860, filed Feb. 13, 2004 now U.S. Pat. No. 7,279,522, the disclosure of which is incorporated by reference in its entirety herein.

1. FIELD OF THE INVENTION

The present invention relates to aqueous fluoropolymer dispersions that are free of low molecular weight fluorinated surfactant or that contain the latter in low amounts. In particular, the present invention relates to reducing the viscosity of such fluoropolymer dispersions that are high in solids content and that contain non-ionic surfactants as a stabilizer.

2. BACKGROUND OF THE INVENTION

Fluoropolymers, i.e. polymers having a fluorinated backbone, have been long known and have been used in a variety of applications because of several desirable properties such as heat resistance, chemical resistance, weatherability, UV-stability etc. . . . . The various fluoropolymers are for example described in "Modern Fluoropolymers", edited by John Scheirs, Wiley Science 1997. The fluoropolymers may have a partially fluorinated backbone, generally at least 40% by weight fluorinated, or a fully fluorinated backbone. Particular examples of fluoropolymers include polytetrafluoroethylene (PTFE), copolymers of tetrafluoroethylene (TFE) and hexafluoropropylene (HFP) (FEP polymers), perfluoroalkoxy copolymers (PFA), ethylene-tetrafluoroethylene (ETFE) copolymers, terpolymers of tetrafluoroethylene, hexafluoropropylene and vinylidene fluoride (THV) and polyvinylidene fluoride polymers (PVDF).

The fluoropolymers may be used to coat substrates to provide desirable properties thereto such as for example chemical resistance, weatherability, water- and oil repellency etc. . . . . For example aqueous dispersions of fluoropolymer may be used to coat kitchen ware, to impregnate fabric or textile e.g. glass fabric, to coat paper or polymeric substrates. For sake of economy and convenience, the fluoropolymer dispersions will typically have between 30% by weight and 70% by weight of fluoropolymer solids.

A frequently used method for producing aqueous dispersions of fluoropolymers involves aqueous emulsion polymerization of one or more fluorinated monomers usually followed by an upconcentration step to increase the solids content of the raw dispersion obtained after the emulsion polymerization. The aqueous emulsion polymerization of fluorinated monomers generally involves the use of a fluorinated surfactant. Frequently used fluorinated surfactants include perfluorooctanoic acids and salts thereof, in particular ammonium perfluorooctanoic acid. Further fluorinated surfactants used include perfluoropolyether surfactants such as disclosed in EP 1059342, EP 712882, EP 752432, EP 816397, U.S. Pat. No. 6,025,307, U.S. Pat. No. 6,103,843 and U.S. Pat. No. 6,126,849. Still further surfactants that have been used are disclosed in U.S. Pat. No. 5,229,480, U.S. Pat. No. 5,763,552, U.S. Pat. No. 5,688,884, U.S. Pat. No. 5,700,859, U.S. Pat. No. 5,804,650, U.S. Pat. No. 5,895,799, WO 00/22002 and WO 00/71590.

Most of these fluorinated surfactants have a low molecular weight, i.e. a molecular weight of less than 1000 g/mol. Recently, such low molecular weight fluorinated compounds have raised environmental concerns. Accordingly, measures have been taken to either completely eliminate the fluorinated low molecular weight surfactants from aqueous dispersion or at least to minimize the amount thereof in an aqueous dispersion. For example, WO 96/24622 and WO 97/17381 disclose an aqueous emulsion polymerization to produce fluoropolymers whereby the polymerization is carried out without the addition of fluorinated surfactant. U.S. Pat. No. 4,369,266 on the other hand discloses a method whereby part of fluorinated surfactant is removed through ultrafiltration. In the latter case, the amount of fluoropolymer solids in the dispersion is increased as well, i.e. the dispersion is upconcentrated while removing fluorinated surfactant. WO 00/35971 further discloses a method in which the amount of fluorinated surfactant is reduced by contacting the fluoropolymer dispersion with an anion exchanger.

Since the solids content of the raw dispersions immediately after emulsion polymerization is usually in the range of up to 35% by weight, the raw dispersions are subjected to an upconcentration process so as to increase the solids content thereof. In order to preserve the stability of the dispersion, the upconcentration typically is carried out in the presence of a stabilizer, in particular a non-ionic surfactant that acts as a stabilizer.

However, when fluoropolymer dispersions that contain no or only a small amount of fluorinated low molecular weight surfactant are upconcentrated, it was found that a viscosity increase results which may be unacceptable. Moreover, the stability of the upconcentrated dispersions may under certain conditions be inferior to dispersions in which the amount of low molecular weight fluorinated surfactant is higher.

Accordingly, there exists a desire to remove one or more of the aforementioned disadvantages of the prior art.

3. SUMMARY OF THE INVENTION

According to one aspect of the present invention, there is provided a fluoropolymer dispersion comprising fluoropolymer particles having an average size of 10 nm to 400 nm dispersed in water whereby the dispersion is free of fluorinated surfactant having a molecular weight of less than 1000 g/mol or contains the fluorinated surfactant having a molecular weight of less than 1000 g/mol in an amount of not more than 0.025% by weight based on the total weight of solids in the dispersion. The dispersion further comprises a non-ionic surfactant and an anionic surfactant selected from fluorinated anionic surfactants having a molecular weight of at least 1000 g/mol, non-fluorinated anionic surfactants and mixtures thereof.

According to a further aspect, the invention also provides a method of providing a fluoropolymer particle dispersion comprising the steps of:

providing a fluoropolymer dispersion comprising fluoropolymer particles having an average size of 10 nm to 400 nm comprising fluorinated surfactant having a molecular weight of less than 1000 g/mol or being free thereof, reducing the amount of the fluorinated surfactant in the dispersion if the amount thereof is more than 0.025% by weight based on the total weight of solids of the dispersion, preferably based on the total weight of fluoropolymer solids in the dispersion;

upconcentrating the fluoropolymer dispersion in the presence of a non-ionic surfactant so as to increase the amount of fluoropolymer solids in the dispersion; and adding an anionic surfactant selected from fluorinated anionic surfactants having a molecular weight of at least 1000 g/mol, non-fluorinated anionic surfactants and mixtures thereof, to the fluoropolymer dispersion prior to or after upconcentrating the fluoropolymer dispersion.

Still further, the present invention provides a method of coating substrates with the aforementioned fluoropolymer dispersion of the invention.

4. DETAILED DESCRIPTION OF THE INVENTION

In accordance with the present invention it was found that a viscosity increase of fluoropolymer dispersions that contain a non-ionic surfactant and that are free of low molecular weight fluorinated surfactant or that contain the latter in low amounts, e.g. less than 0.025% by weight (based on the total weight of solids, in particular on the total weight of fluoropolymer solids in the dispersion), preferably not more than 0.01% by weight and most preferably less than 0.005% by weight, can be reduced or avoided if the fluoropolymer dispersion contains an anionic non-fluorinated surfactant, an anionic fluorinated surfactant having a molecular weight of at least 1000 g/mol (hereinafter called high molecular weight fluorinated surfactant) or a mixture thereof. Furthermore, the stability of the fluoropolymer dispersion may also be improved by the addition of the anionic non-fluorinated surfactant or anionic high molecular weight fluorinated surfactant.

Preferred anionic non-fluorinated surfactants are surfactants that have an acid group that has a $pK_a$ of not more than 4, preferably not more than 3. It was found that such anionic surfactants in addition to controlling the viscosity, are generally also capable of increasing the stability of the fluoropolymer dispersion. Examples of non-fluorinated anionic surfactants include surfactants that have one or more anionic groups. Anionic non-fluorinated surfactants may include in addition to one or more anionic groups also other hydrophilic groups such as polyoxyalkylene groups having 2 to 4 carbons in the oxyalkylene group, such as polyoxyethylene groups, or groups such as such as an amino groups. Nevertheless, when amino groups are contained in the surfactant, the pH of the dispersion should be such that the amino groups are not in their protonated form. Typical non-fluorinated surfactants include anionic hydrocarbon surfactants. The term "anionic hydrocarbon surfactants" as used herein comprises surfactants that comprise one or more hydrocarbon moieties in the molecule and one or more anionic groups, in particular acid groups such as sulphonic, sulfuric, phosphoric and carboxylic acid groups and salts thereof. Examples of hydrocarbon moieties of the anionic hydrocarbon surfactants include saturated and unsaturated aliphatic groups having for example 6 to 40 carbon atoms, preferably 8 to 20 carbon atoms. Such aliphatic groups may be linear or branched and may contain cyclic structures. The hydrocarbon moiety may also be aromatic or contain aromatic groups. Additionally, the hydrocarbon moiety may contain one or more hetero atoms such as for example oxygen, nitrogen and sulfur.

Particular examples of anionic hydrocarbon surfactants for use in this invention include alkyl sulfonates such as lauryl sulfonate, alkyl sulfates such as lauryl sulfate, alkylarylsulfonates and alkylarylsulfates, fatty (carboxylic) acids and salts thereof such as lauric acids and salts thereof and phosphoric acid alkyl or alkylaryl esters and salts thereof. Commercially available anionic hydrocarbon surfactants that can be used include Emulsogen™ LS (sodium lauryl sulfate) and Emulsogen™ EPA 1954 (mixture of $C_{12}$ to $C_{14}$ sodium alkyl sulfates) available from Clariant GmbH and TRITON™ X-200 (sodium alkylsulfonate) available from Union Carbide. Preferred are anionic hydrocarbon surfactants having a sulfonate group.

Other suitable anionic non-fluorinated surfactants include silicone based surfactants such as polydialkylsiloxanes having pending anionic groups such as phosphoric acid, groups, carboxylic acid groups, sulfonic acid groups and sulfuric acid groups and salts thereof.

Alternative to or in addition to the anionic non-fluorinated surfactant, a high molecular weight fluorinated surfactant can be used. The high molecular weight fluorinated surfactant has a molecular weight of at least 1000 g/mol, preferably at least 1200 g/mol. Examples of high molecular weight anionic and fluorinated surfactants comprise polymeric surfactants and include perfluoropolyethers having one or more anionic groups such as carboxylic acid groups or salts thereof. Examples of perfluoropolyether surfactants include those according to the following formulas (I) or (II):

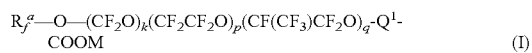

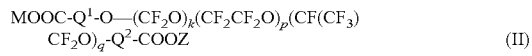

wherein k, p and q each represent a value of 0 to 15, typically 0 to 10 or 12 and the sum of k, p and q being such that the number average molecular weight is at least 1000 g/mol, $R_f^a$ represents a perfluoroalkyl group preferably of 2 to 4 carbon atoms, M and Z each independently represent hydrogen or a cation, preferably a monovalent cation such as ammonium or an alkali metal ion and $Q^1$ and $Q^2$ each independently represents —$CF_2$— or —$CF(CF_3)$—.

Examples of fluorinated surfactants of formula (II) include those corresponding to the formula:

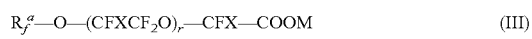

wherein $R_f^a$ and M have the meaning as defined in formula (II), X is a hydrogen atom or a fluorine atom and r has a value such that the molecular weight of the surfactant is at least 1000 g/mol. Examples of such fluorinated surfactants are disclosed in EP 219065.

Still further fluorinated polymeric surfactants that can be used include the perfluoropolymers that comprise repeating units of the formula:

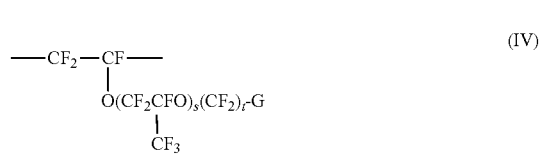

wherein s is 0, 1 or 2, and t is an integer of 2 to 4, and G is a moiety containing one or more anionic groups. Examples of suitable anionic groups include: carboxyl groups, e.g., —$CO_2M$ where M may be hydrogen, a mono or divalent metal ion (e.g., sodium, potassium or magnesium), ammonium (e.g., simple ammonium, tetraalkylammonium, tetraarylammonium) or phosphonium (e.g., tetraalkylphosphonium); or sulfonate groups, e.g., —$SO_3M$, where M is defined as above. Preferably, the fluorinated polymeric surfactant is a copolymer having units derived from tetrafluoroethylene and units according to formula (IV). Such copolymers and their method of making are disclosed in for example U.S. Pat. No. 5,608,022 and WO 00/52060. Suitable fluorinated polymeric surfactants are available as Nafion™ superacid catalysts from E. I duPont de Nemours & Co., Wilmington, Del. and are also available as Flemion™ superacid polymers from Asahi Chemical Co., Osaka, Japan and as Acipex™ superacid polymers from Asahi Glass Co., Tokyo, Japan.

The amount of anionic surfactant added to the fluoropolymer dispersion will generally depend on the nature of the fluorinated surfactant, nature and amount of the fluoropolymer, nature and amount of non-ionic surfactant present in the dispersion and nature and amount of low molecular weight fluorinated surfactant that may be present in the fluoropolymer dispersion. Typically, the amount of anionic surfactant will be between 10 ppm and 5000 ppm, preferably between 100 ppm and 3000 ppm, more preferably between 100 ppm and 2500 ppm based on the weight of the fluoropolymer solids in the dispersion. When too low amounts of the anionic surfactant are used, an undesirable viscosity increase may still be observed. On the other hand, when too large amounts of the anionic surfactant are added the viscosity may also raise. If it is further desired or needed to increase the stability of the dispersion, it may be necessary to use the anionic surfactant in an amount of at least 2000 ppm based on the weight of fluoropolymer solids. The optimal concentration of the anionic surfactant in the dispersion can be easily determined by one skilled in the art through routine experimentation.

The low molecular weight fluorinated surfactant, when present, may be any of the low molecular weight fluorinated surfactants that can be used in the emulsion polymerization of fluorinated monomers and include in particular those that have been mentioned above in respect of the discussion of the prior art. Commonly used low molecular weight fluorinated surfactants are telogenic and include those that correspond to the formula:

$$Y-R_f-Z-M \quad (V)$$

wherein Y represents hydrogen, Cl or F; $R_f$ represents a linear or branched perfluorinated alkylene having 4 to 10 carbon atoms; Z represents $COO^-$ or $SO_3^-$ and M represents a monovalent cation such as an alkali metal ion or an ammonium ion.

The low molecular weight fluorinated surfactant, when present in the fluoropolymer dispersion, may be present in amounts of less than 0.025% by weight, preferably not more than 0.01% by weight and most preferably not more than 50 ppm based on the total amount of solids in the dispersion.

The fluoropolymer dispersion of the present invention also includes a non-ionic surfactant. The non-ionic surfactant is generally a non-fluorinated non-ionic surfactant. Typically, the non-ionic surfactant is a surfactant that contains one or more hydrocarbon moieties, e.g. as described above, linked to a non-ionic hydrophilic group. The non-ionic hydrophilic group generally comprises oxyalkylene groups in which the alkylene group has 2, 3 or 4 carbon atoms. For example, the non-ionic hydrophilic group may be a polyoxyethylene group, a polyoxypropylene group or a copolymer, including block-copolymers, comprising oxyethylene and oxypropylene groups. According to a particular embodiment in connection with the present invention, the non-ionic surfactant corresponds to the formula:

$$R^1-O-[CH_2CH_2O]_n-[R^2O]_m-R^3 \quad (VI)$$

wherein $R^1$ represents an aromatic or aliphatic hydrocarbon group having at least 8 carbon atoms, $R^2$ represents an alkylene having 3 carbon atoms, $R^3$ represents hydrogen or a $C_1$-$C_3$ alkyl group, n has a value of 0 to 40, m has a value of 0 to 40 and the sum of n+m being at least 2.

It will be understood that in the above formula (VI), the units indexed by n and m may appear as blocks or they may be present in an alternating or random configuration.

Examples of non-ionic surfactants according to formula (VI) above include alkylphenol oxy ethylates of the formula:

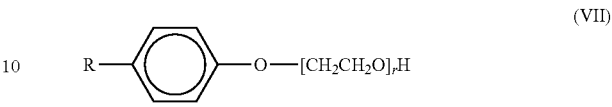

(VII)

wherein R is an alkyl group of 4 to 20 carbon atoms and r represents a value of 4 to 20. Examples of surfactants according to formula (VII) include ethoxylated p-isooctylphenol commercially available under the brand name TRITON™ such as for example TRITON™ X 100 wherein the number of ethoxy units is about 10 or TRITON™ X 114 wherein the number of ethoxy units is about 7 to 8.

Still further examples include those in which $R^1$ in the above formula (VI) represents an alkyl group of 4 to 20 carbon atoms, m is 0 and $R^3$ is hydrogen. An example thereof includes isotridecanol ethoxylated with about 8 ethoxy groups and which is commercially available as GENAPOL® X 080 from Clariant GmbH. Non-ionic surfactants according to formula (VI) in which the hydrophilic part comprises a block-copolymer of ethoxy groups and propoxy groups may be used and well. Such non-ionic surfactants are commercially available from Clariant GmbH under the trade designation GENAPOL® PF 40 and GENAPOL® PF 80.

The non-ionic surfactant is generally present in the fluoropolymer dispersion in an amount of 1% by weight to 12% by weight relative to the total weight of solids in the fluoropolymer dispersion. Preferably the amount is between 3% by weight and 10% by weight.

The fluoropolymer contained in the fluoropolymer dispersion is a polymer that has a partially or fully fluorinated backbone. Typically the fluoropolymer is a polymer that has a backbone that is at least 40% by weight fluorinated, preferably at least 50% by weight, more preferably at least 60% by weight. The fluoropolymer may also have a fully fluorinated backbone such as for example in PTFE. The fluoropolymer may be a homo- or copolymer and the dispersion may contain a mixture of different fluoropolymers. Examples of fluoropolymers include copolymers of tetrafluoroethylene which can be processed from the melt, especially those of tetrafluoroethylene/hexafluoropropylene, tetrafluoroethylene/perfluoro(alkylvinyl)ethers with perfluoroalkyl radicals having 1 to 5 C atoms, in particular perfluoro(n-propyl-vinyl)ethers, tetrafluoroethylene/ethylene, tetrafluoroethylene/trifluorochloroethylene, trifluorochloroethylene/ethylene, tetrafluoroethylene/vinylidene fluoride and hexafluoropropylene/vinylidene fluoride, and terpolymers of tetrafluoroethylene/perfluoro(alkylvinyl)ether/hexafluoropropylene, tetrafluoroethylene/ethylene/hexafluoropropylene and tetrafluoroethylene/vinylidene fluoride/hexafluoropropylene, or of quaternary polymers of tetrafluoroethylene/vinylidene fluoride/hexafluoropropylene/perfluoro(alkylvinyl)ethers and tetrafluoroethylene/ethylene/hexafluoropropylene/perfluoro(alkylvinyl)ethers. Further fluoropolymers that can be used in the dispersion include polyvinyl fluoride, polyvinylidene fluoride and polytrifluorochloroethylene. The dispersion may also comprise polymers that cannot be processed from the melt such as polytetrafluoroethylene, that is to say of the homopolymer and which can optionally contain modifying comonomers, such as hexafluoropropylene or perfluoro (alkylvinyl)ethers or chlorotrifluoroethylene, in small proportions (0.1 to 3 mol %).

The average particle size (average particle diameter) of the fluoropolymer in the dispersion is generally in the range of 10 nm to 400 nm, preferably between 25 nm and 400 nm. The average particle diameter is generally determined through dynamic light scattering and a number average particle diameter may thereby be determined. The dispersion may be mono-modal as well as multi-modal such as bimodal. The amount of fluoropolymer in the dispersion is typically at least 30% by weight, for example between 35% by weight and 70% by weight.

The fluoropolymer dispersions can be used to coat a substrate. For example the fluoropolymer dispersions may be used to coat a metal substrate, polymeric substrates such as polyester and polypropylene substrates or to coat paper. The fluoropolymer dispersions may also be used to coat or impregnate textile or fabrics, in particular glass fiber substrates. Before coating, the fluoropolymer dispersion may be mixed with further ingredients to prepare a coating composition as may be desired for the particular coating application. For example, the fluoropolymer dispersion may be combined with polyamide imide and polyphenylene sulfone resins as disclosed in for example WO 94/14904 to provide anti-stick coatings on a substrate. Further coating ingredients include inorganic fillers such as colloidal silica, aluminium oxide, and inorganic pigments as disclosed in for example EP 22257 and U.S. Pat. No. 3,489,595.

The fluoropolymer dispersions are generally obtained by starting from a so-called raw dispersion, which may result from an emulsion polymerization of fluorinated monomer. Such dispersion may be free of low molecular weight fluorinated surfactant if the polymerization has been conducted in the absence of a low molecular weight fluorinated surfactant but will generally contain substantial amounts of low molecular weight fluorinated surfactant. If the concentration of low molecular weight fluorinated surfactant in the dispersion is more than a desired level, e.g. above 0.025% by weight, at least part thereof should be removed.

According to one embodiment to reduce the amount of low molecular weight of fluorinated surfactant, a non-ionic surfactant, e.g. as disclosed above is added to the fluoropolymer dispersion and the fluoropolymer dispersion is then contacted with an anion exchanger. Such a method is disclosed in detail in WO 00/35971. Suitable anion exchangers include those that have a counterion corresponding to an acid having a $pK_a$ value of at least 3.

The anion exchange process is preferably carried out in essentially basic conditions. Accordingly, the ion exchange resin will preferably be in the OH⁻ form although anions like fluoride or oxalate corresponding to weak acids may be used as well. The specific basicity of the ion exchange resin is not very critical. Strongly basic resins are preferred because of their higher efficiency in removing the low molecular weight fluorinated surfactant. The process may be carried out by feeding the fluoropolymer dispersion through a column that contains the ion exchange resin or alternatively, the fluoropolymer dispersion may be stirred with the ion exchange resin and the fluoropolymer dispersion may thereafter be isolated by filtration. With this method, the amount of low molecular weight fluorinated surfactant can be reduced to levels below 150 ppm or even below 10 ppm. Accordingly, dispersions substantially free of low molecular weight fluorinated surfactant may thereby be obtained.

In case the low molecular weight fluorinated surfactant is in its free acid form is steam-volatile, the following method may be used to reduce the amount of low molecular weight fluorinated surfactant. A steam-volatile fluorinated surfactant in its free acid form may be removed from aqueous fluoropolymer dispersions, by adding a nonionic surfactant to the aqueous fluoropolymer dispersion and, at a pH-value of the aqueous fluoropolymer dispersion below 5, removing the steam-volatile fluorinated surfactant by distillation until the concentration of steam-volatile fluorinated surfactant in the dispersion reaches the desired value. Low molecular weight fluorinated surfactant that can be removed with this process include for example the surfactants according to formula (V) above.

It will generally be desirable to increase the amount of fluoropolymer solids in the dispersion. To increase the amount of fluoropolymer solids, any of the upconcentration techniques may be used. These upconcentration techniques are typically carried out in the presence of a non-ionic surfactant which is added to stabilize the dispersion in the upconcentration process. The amount of non-ionic surfactant that should generally be present in the dispersion for upconcentration is typically between 1% by weight and 12% by weight, preferably between 3% by weight and 10% by weight. Suitable methods for upconcentration include ultrafiltration, thermal upconcentration, thermal decantation and electrodecantation as disclosed in GB 642,025.

The method of ultrafiltration comprises the steps of (a) adding non-ionic surfactant to a dispersion that desirably is to be upconcentrated and (b) circulating the dispersion over a semi-permeable ultra-filtration membrane to separate the dispersion into a fluorinated polymer dispersion concentrate and an aqueous permeate. The circulation is typically at a conveying rate of 2 to 7 meters per second and effected by pumps which keep the fluorinated polymer free from contact with components which cause frictional forces. The method of ultrafiltration further has the advantage that during upconcentration also some low molecular weight fluorinated surfactant is removed. Accordingly, the method of ultrafiltration may be used to simultaneously reduce the level of low molecular weight fluorinated surfactant and upconcentrate the dispersion.

To increase the fluoropolymer solids in the aqueous dispersion, thermal decantation may also be employed. In this method, a non-ionic surfactant is added to the fluoropolymer dispersion that is desirably upconcentrated and the dispersion is then heated so as to form a supernatant layer that can be decanted and that typically contains water and some nonionic surfactant while the other layer will contain the concentrated dispersion. This method is for example disclosed in U.S. Pat. No. 3,037,953 and EP 818506.

Thermal upconcentration involves heating of the dispersion and removal of water under a reduced pressure until the desired concentration is obtained.

In accordance with the present invention, the anionic surfactant to control viscosity is added prior to or after the upconcentration depending on the method of upconcentration used. For example, if ultrafiltration is used, it will generally be preferred to add the anionic surfactant subsequent to the upconcentration to avoid loss thereof in the ultrafiltration. If the thermal upconcentration method is used, the anionic surfactant can be added prior to the upconcentration as well as subsequent to the upconcentration.

EXAMPLES

Abbreviations

PTFE=polytetrafluoroethylene
APFOA=ammonium salt of perfluorooctanoic acid

TRITON™ X-100=ethoxylated p-isooctylphenol non-ionic surfactant
EMULSOGEN™ LS=sodium lauryl sulfate
TRITON™ X-200=sodium alkylarylpolyether sulfonate Test Methods:

The viscosity of the dispersions was measured using a Brookfield Rheometer DV-III, spindel 86 at 20° C. and 20 D/1/s.

Stability Test:

The fluoropolymer dispersion was mixed and agitated with additional components to formulate a coating composition as disclosed in EP 894541. To this end, the fluoropolymer dispersion was mixed with an aqueous composition containing a polyamideimide resin (PAI) such that the weight ratio of fluoropolymer solids to PAI solids was 1:1.

Mixing was carried out with a blade agitator at 800 rpm. The time until coagulation occurred was noted.

Comparative Example 1

A fluoropolymer dispersion of PTFE of a particle size of about 220 nm and having a solids content between 23% by weight was obtained from an emulsion polymerization. To the dispersion were added 6% by weight of TRITON™ X-100. The dispersion contained about 0.1% by weight of APFOA based on total weight of the dispersion (=4350 ppm based on polymer solids). The dispersion was upconcentrated through ultrafiltration to an amount of PTFE solids of 60% by weight. The resulting dispersion had a viscosity of 20 mPa.

Comparative Example 2

The procedure of comparative example 1 was repeated except that the dispersion obtained after the emulsion polymerization was contacted with an anion exchange resin so as to reduce the amount of APFOA in the dispersion to 7 ppm based on total weight of the dispersion (=30 ppm based on polymer solids). This dispersion was then upconcentrated as described in comparative example 1. It was found that the viscosity of the dispersion was increased to 101 mPa. The dispersion had a too high viscosity for coating substrates such as metal substrates or glass cloth because of bubble building.

Example 1

To the dispersion obtained in comparative example 2 after upconcentration, there was added 2000 ppm based on the solids amount of EMULSOGEN™ LS. The viscosity of the dispersion thereby decreased to 16.7 mPa. The dispersion thus obtained is suitable for coating for example metal substrates.

Example 2

To the dispersion obtained in comparative example 2 after upconcentration, there was added 1500 ppm based on the solids amount of TRITON™ X-200. The viscosity of the dispersion thereby decreased to 18 mPa. The dispersion thus obtained is suitable for coating for example metal substrates.

Comparative Example 3

A PTFE dispersion having 7 ppm APFOA was upconcentrated to 58% solids in the presence of 5% of TRITON™ X-100. The obtained dispersion was tested for stability. Immediately coagulation occurred.

Example 3

A dispersion was produced as in example 1 but with the difference that only 1500 ppm of EMULSOGEN™ LS was used. Coagulation occurred after about 1 hour.

Example 4

A dispersion was produced as in example 1 but with the difference that only 3000 ppm of EMULSOGEN™ LS was used. No coagulation occurred during at least 20 hours of agitation.

Comparative Example 4

A dispersion of PTFE containing 7 ppm of APFOA (based on total weight of the dispersion) and 8.5% by weight based on total weight of solids, of non-ionic surfactant was prepared. The dispersion had a solids amount of 59% by weight based on the total weight of the dispersion. The viscosity of this dispersion was 275 mPas and as a result, coating of glass cloth was not possible because of air entrapment.

Example 5

A PTFE dispersion as in comparative example 4 was prepared and 3000 ppm (based on total solids) of EMULSOGEN™ LS were added. The viscosity of this dispersion was only 37 mPas allowing the coating of glass cloth without air entrapment.

The invention claimed is:

1. Fluoropolymer dispersion comprising fluoropolymer particles having an average particle size of 10 to 400 nm dispersed in water, said dispersion being free of fluorinated surfactant having a molecular weight of less than 1000 g/mol or containing said fluorinated surfactant having a molecular weight of less than 1000 g/mol in an amount of not more than 0.025% by weight based on the total weight solids of said dispersion, said dispersion further comprising a non-ionic surfactant characterized in that said dispersion contains an anionic surfactant selected from fluorinated anionic surfactants having a molecular weight of at least 1000 g/mol, non-fluorinated anionic surfactants and mixtures thereof, wherein said dispersion comprises at least 30% by weight of the fluoropolymer particles based on the total weight of said dispersion because said dispersion is upconcentrated using ultrafiltration or thermal concentration, wherein the anionic surfactant is present in an amount of 100 to 3000 ppm based on the total weight of solids in the dispersion.

2. Fluoropolymer dispersion according to claim 1 wherein the anionic surfactant comprises a non-fluorinated anionic surfactant comprising an acid group having a $pK_a$ of less than 4.

3. Fluoropolymer dispersion according to claim 1 wherein the amount of fluoropolymer particles is between 35% by weight and 70% by weight.

4. Fluoropolymer dispersion according to claim 1 wherein the non-ionic emulsifier corresponds to the formula:

$R^1$—O—$[CH_2CH_2O]_n$—$[R^2O]_m$—$R^3$ wherein $R^1$ represents an aromatic or aliphatic hydrocarbon group having at least 8 carbon atoms, $R^2$ represents an alkylene having 3 carbon atoms, $R^3$ represents hydrogen or a $C_1$-$C_3$ alkyl group, n has a value of 0 to 40, m has a value of 0 to 40 and the sum of n+m being at least 2.

5. Fluoropolymer dispersion according to claim 1 wherein the amount of non-ionic emulsifier is between 1% and 12% by weight relative to the total weight of solids in the dispersion.

6. Fluoropolymer dispersion according to claim 1 wherein the fluoropolymer particles comprise polytetrafluoroethylene and/or a melt processible fluoropolymer.

7. Fluoropolymer dispersion according to claim 1 wherein the fluoropolymer dispersion is polymerized in the presence of a fluorinated surfactant having a molecular weight of less than 1000 g/mol.

\* \* \* \* \*